United States Patent
Polad

(10) Patent No.: US 7,996,152 B2
(45) Date of Patent: Aug. 9, 2011

(54) ENHANCED INFORMATION SECURITY SYSTEM

(76) Inventor: Alaa Polad, Costa Mesa, CA (US)

( * ) Notice: Subject to any disclaimer, the term of this patent is extended or adjusted under 35 U.S.C. 154(b) by 606 days.

(21) Appl. No.: 12/173,743

(22) Filed: Jul. 15, 2008

(65) Prior Publication Data

US 2010/0017125 A1    Jan. 21, 2010

(51) Int. Cl.
*G01C 21/00* (2006.01)
*G01S 5/00* (2006.01)

(52) U.S. Cl. ............ 701/213; 701/207; 455/456.3; 340/426.19

(58) Field of Classification Search ........... 701/202, 701/207, 209, 211, 213; 455/456.1–456.6; 340/426.19
See application file for complete search history.

(56) References Cited

U.S. PATENT DOCUMENTS

| | | | |
|---|---|---|---|
| 6,751,452 B1 * | 6/2004 | Kupczyk et al. | 455/345 |
| 7,505,772 B2 * | 3/2009 | Himmelstein | 455/456.1 |
| 7,532,899 B2 * | 5/2009 | Wilson et al. | 455/456.3 |
| 7,783,306 B2 * | 8/2010 | Wilson et al. | 455/456.3 |

* cited by examiner

*Primary Examiner* — Richard M. Camby
(74) *Attorney, Agent, or Firm* — Edwin Tarver; Lauson & Tarver LLP

(57) ABSTRACT

An improved security system for monitoring passengers aboard vehicles in real time uses existing off-the-shelf computer technology and an associated GPS system and wireless Internet to enable peripheral devices capable of obtaining a variety of data aboard a vehicle and transmitting that data to a remote location, including a stationary location where the data can be monitored. The method connects power derived from the vehicle, with a wireless Internet and GPS enabled laptop to enable tracking of the vehicle. Additionally, peripheral devices including cameras, audio/visual displays and identification means are associated with the mobile laptop, enabling the system to track individual passengers aboard the vehicle.

17 Claims, 3 Drawing Sheets

ENHANCED INFORMATION SECURITY SYSTEM

CROSS-REFERENCE TO RELATED APPLICATION

None

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

Internet based communication systems for vehicles are known in the art. U.S. Pat. No. 6,751,452 to Kupczyk, et al discloses an internet based two-way data communication system for programming the electronics of motor vehicles, including GPS and real time communication capabilities.

U.S. Pat. App. 2003/649157 to Salande discloses an interactive system for live streaming of data to and from a moving vehicle using GPS and cellular communications for transmitting data collected by a plurality of video cameras positioned inside and outside the vehicle.

U.S. Pat. App. 2000/593881 to Kolls discloses an in-vehicle device data communications with Internet based data processing resources for the purpose of transacting e-mail and e-commerce.

The above references and transportation devices employing systems that rely on radio frequency to disclose the transmission of data from a moving vehicle to a station or other location. However, these devices are insufficient to provide up to date safety and security information regarding specific passengers or items of merchandise aboard a vehicle, and are unable to perform these functions using commercially available parts.

Therefore it is an object of the present invention to provide a system for wirelessly transmitting data collected aboard a moving vehicle, between buildings, loading docks, or between other locations with communication rules established by a headquarters location that cannot be altered by secondary, tertiary or other locations without the headquarters' permission. Another object is to provide locations where the data can provide real time security information using conventional laptop or desktop computers or any other computing means. A further object of the invention is to provide a security system that employs readily available "off-the-shelf" technology that allows a user to inexpensively assemble an Internet based vehicle security system. These and other objects will become apparent in the following Summary, Description and Claims.

SUMMARY

The present invention comprises a method of providing an improved security system for vehicles that transport passengers or merchandise. The method employs laptops with GPS and wireless internet capability to locate and report data, including the position of a transport vehicle relative to a headquarters position, including a stationary position for monitoring in real time. Bus service is one preferred application of the method, however a variety of transportation methods are contemplated.

Once a set of predetermined points is identified comprising the route of the transport vehicle, wireless Internet coverage is ensured along the route, and destinations along the route are determined if the vehicle is scheduled to make multiple stops. The hardware for the system comprises at least one mobile laptop that travels with at least one vehicle, and a laptop at a headquarters location, including a stationary location. The headquarters location laptop can record functions, including audio, video and data functions, store data with a date and time stamp for future reference, and provide an access means for retrieving the data. Other hardware connected to the laptops enables them to communicate audio visual and GPS data over the Internet. The data transmitted may comprise transactional information, including fare and cash receipt information in addition to other information, such as identifiers.

GPS coordinates corresponding to physical addresses are programmed into the system and display so that they can be displayed and easily understood by users of the system. Once the software for a particular user and route is coded, it is loaded onto the vehicle laptop and stationary laptop. Once the system is physically installed into the vehicle and headquarters location, the hardware is connected, software installed, and the system enabled. The laptop aboard the vehicle will then transmit data regarding the location of the vehicle, as well as data comprising the input signals of the additional hardware to the laptop at the headquarters position via a secure Internet connection, allowing a user at the headquarters location to monitor the progress of the vehicle along the route.

FIGURES

DESCRIPTION

The present invention comprises a method of increasing communication in a transportation context between a headquarters or control location and a transportation vehicle on route between two points. The system employs laptop technology along with peripheral devices, including a position determining means, including a global positioning system, or "GPS" to locate and report the position of the vehicle in real time. Bus service will be used by way of example, although other types of vehicles and transportation are contemplated.

Figure 1:
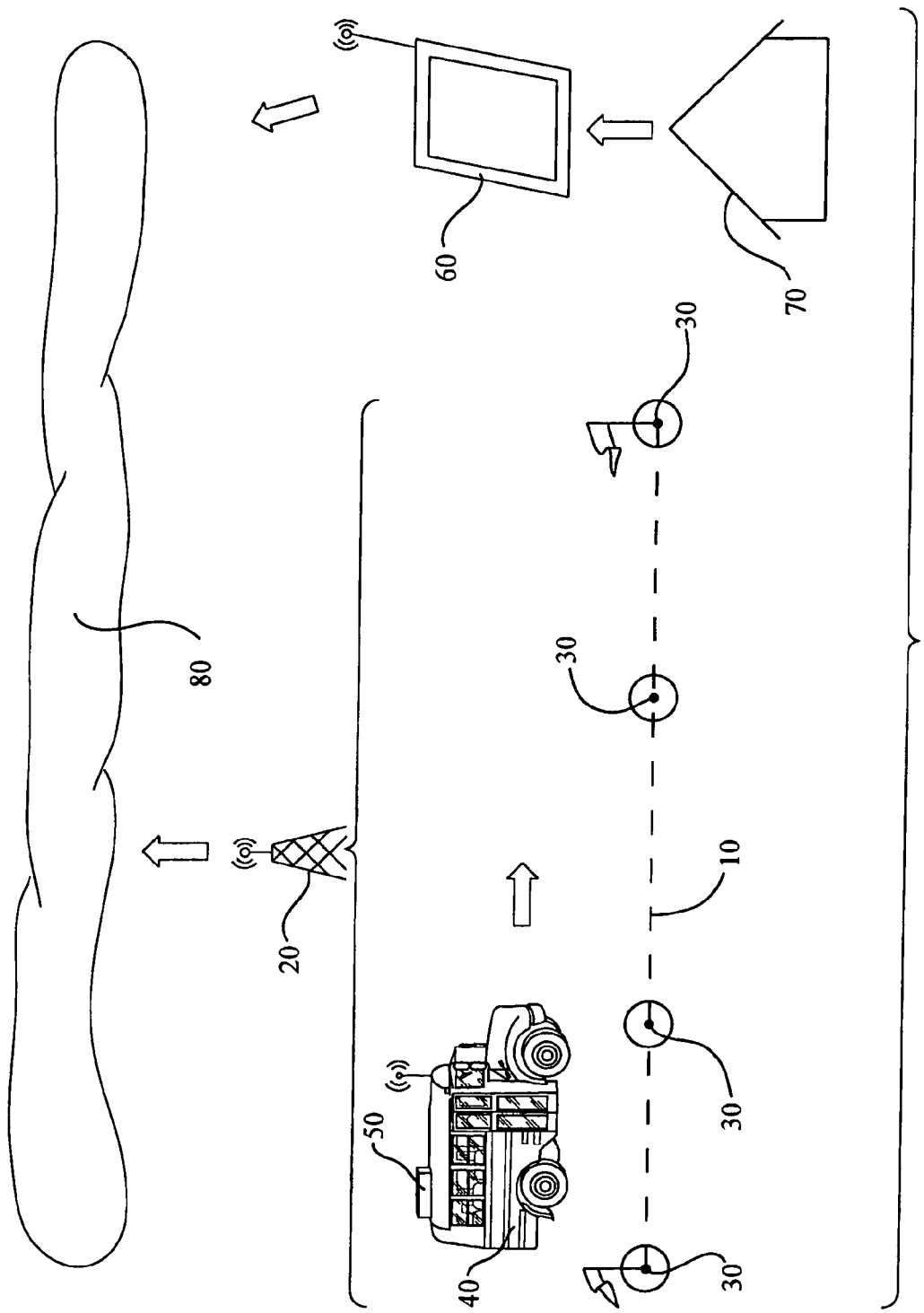
FIG. 1 is a diagram of the present invention.

Referring to FIG. 1, in order to engage in the method of the present invention, a set of predetermined points must first be identified, comprising the starting point, destination and route of a transport vehicle. Once the route (10) is determined, a second determination must be made, to ensure that wireless Internet coverage (20) is available along the route.

With the route established and Internet coverage verified, destinations (30) along the route are selected for a transport vehicle (40). It is anticipated that high volume transit destinations will be utilized. The number of destinations (30) along the route, and the number of anticipated passengers in transit along the route will govern the provisioning of hardware necessary to implement the system.

The hardware for the system comprises two classes of devices; a mobile device (50) that travels with the vehicle (40), and a device (60) at a headquarters location (70), including a stationary location. In a preferred embodiment, the devices comprise off the shelf laptop computers that are equipped with means for accessing the Internet wirelessly. In addition to the laptops, other means, herein referred to as "peripherals" are connected to the laptops at both the headquarters location (70) and on board the vehicle (40). The peripherals enable the laptops to communicate data including audio visual and GPS data over the Internet (80). In the event multiple vehicles are employed in the system, each vehicle is equipped with at least one laptop.

GPS coordinates are documented, wherein the GPS coordinates correspond to a predetermined code, and wherein the predetermined code corresponds to the physical addresses of the GPS coordinates. In this manner, stops made by the vehicle at specific GPS coordinates can be made to correspond with locations that are easily understood by users of the system. In the event that the GPS coordinates are publicly available, the destination of the vehicle can be used without coding. Depending on the user of the system, establishing the coding for interpreting GPS data into physical addresses and other locations is done on a case by case basis.

Once the software for a particular user and route is coded, the software is loaded onto the vehicle laptop and stationary laptop. At this time also, the vehicle laptop and headquarters laptop are configured to accept inputs from the various peripheral hardware elements.

Once the system is physically installed into the vehicle or vehicles, and headquarters location, the peripherals connected and the software installed, the system is triggered, either manually, or automatically upon the occurrence of a predetermined event. As the system deploys, the laptop aboard the vehicle will transmit data regarding the location of the vehicle, as well as data comprising the input signals of the peripherals to the laptop at the headquarters position via a secure Internet connection. In this manner, a user at the headquarters, with a secure connection to the system via the Internet can monitor the progress of the vehicle, and the passengers within the vehicle, as it moves along the route.

Figure 2:
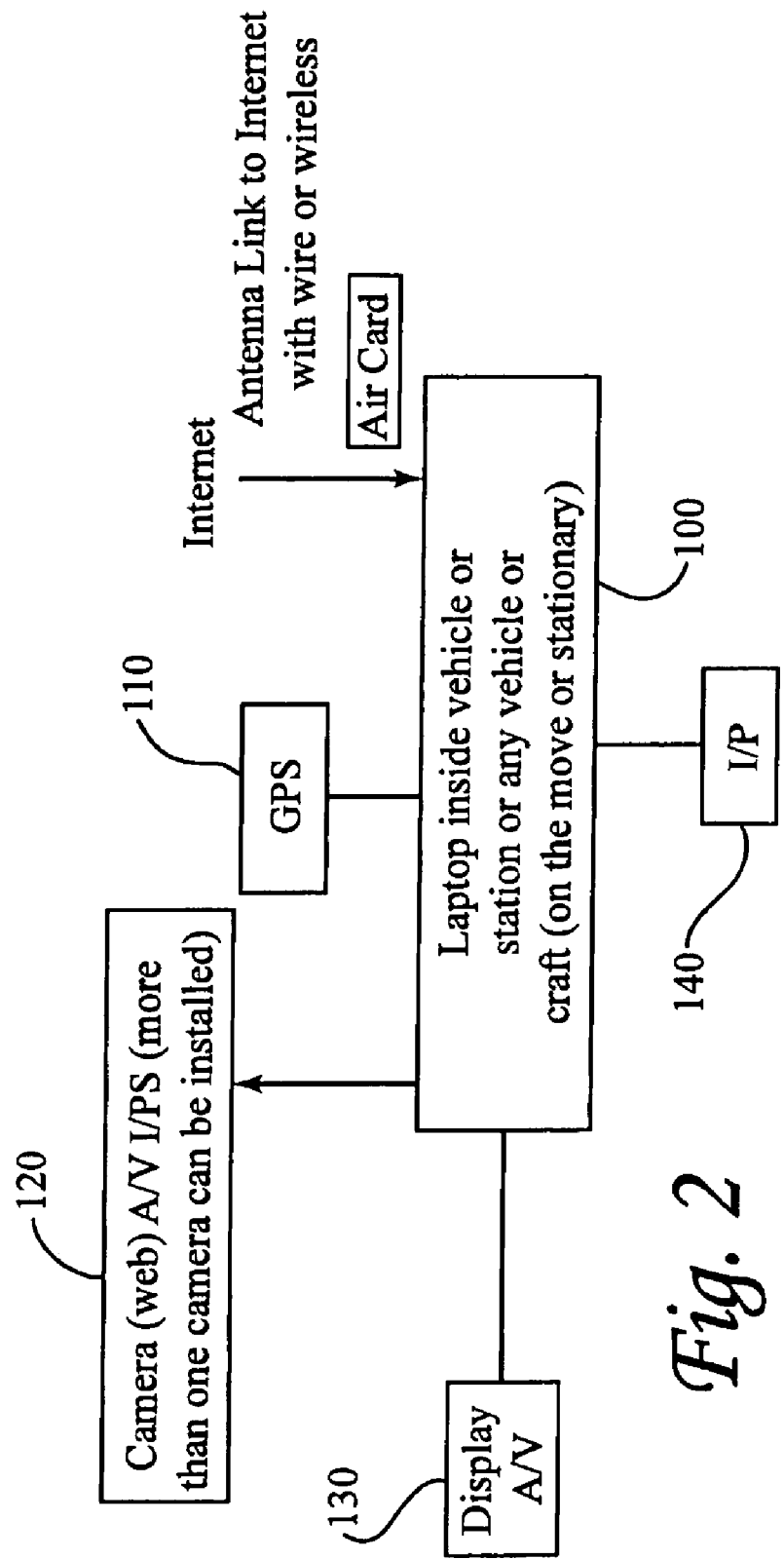
FIG. 2 is a diagram of the mobile device of the invention and its associated peripheral devices.

Referring to FIG. 2, the peripherals connected to the vehicle onboard laptop (100) comprise at a minimum; global positioning system or GPS means (110), a camera means (120), an audiovisual display means (130). Additional peripheral inputs (140) may be selected for use, including tag readers for passengers, magnetic stripe card reading means, destination indicating means, vehicle route display means, emergency alert means, anti-theft means, microphone means, smoke and carbon monoxide detection means, compressed natural gas sensing and measuring means, a keypad means for inputting text, inputs for medical devices measuring blood pressure, body temperature, heart rate, and vital signs, and an input means for changing the destination.

In one preferred embodiment, the vehicle onboard laptop and other hardware are configured to fit inside a mobile box. The mobile box is housed in a compartment inside the vehicle, and in an alternate embodiment is housed outside the vehicle under the chassis. The mobile box comprises a laptop computer with a wireless Internet sensing capability and GPS means enclosed in a ventilated container. A power inverter, for converting D/C to A/C is associated with the box, and in one embodiment provides at least 300 watts of power.

Figure 3:
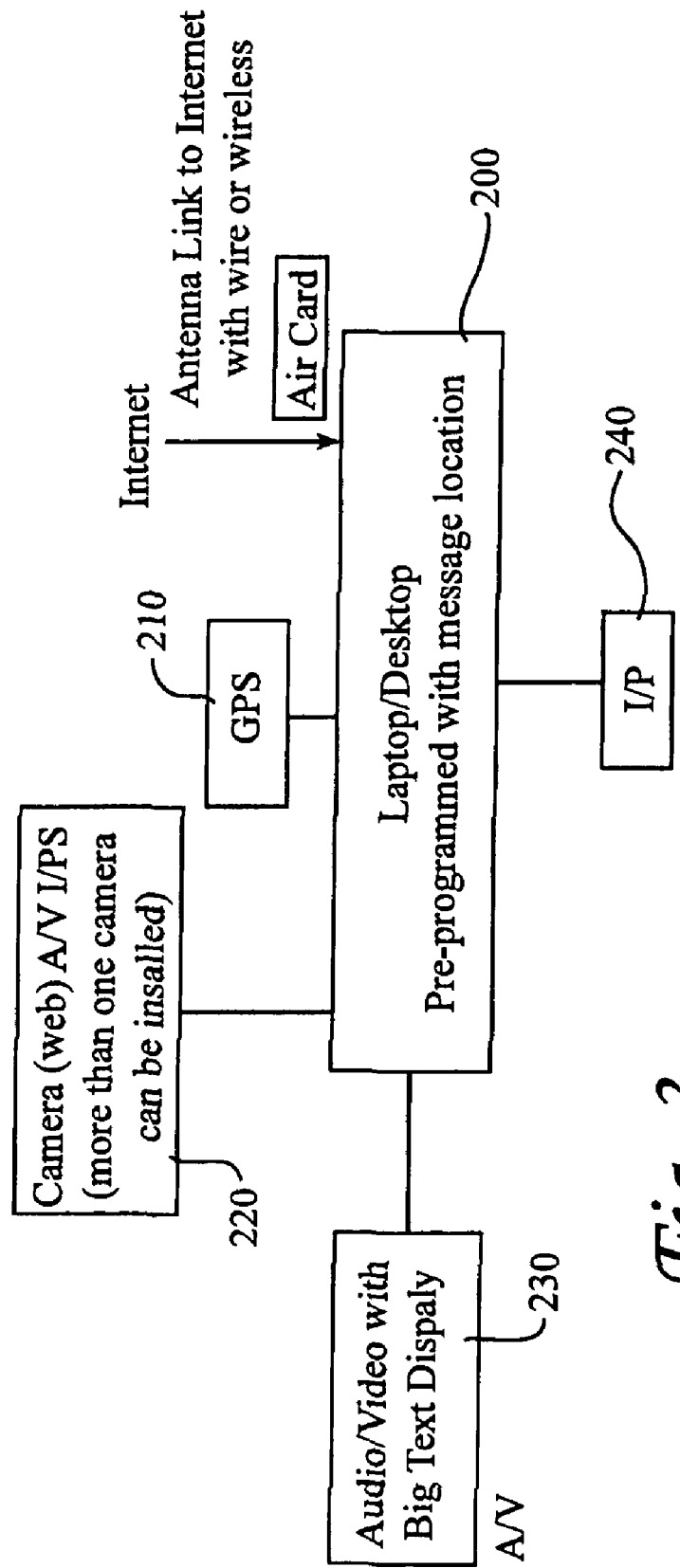
FIG. 3 is a diagram of the headquarters device of the invention and its associated peripheral devices.

Referring to FIG. 3, the peripherals connected to the headquarters computer (200) comprise at a minimum; global positioning system or GPS means (210), a camera means (220), an audiovisual display means (230). Additional peripheral inputs (240) may be selected for use, including tag readers for passengers, magnetic stripe card reading means, destination indicating means, vehicle route display means, emergency alert means, anti-theft means, microphone means, smoke and carbon monoxide detection means, compressed natural gas sensing and measuring means, a keypad means for inputting text, inputs for medical devices measuring blood pressure, body temperature, heart rate, and vital signs, and an input means for changing the destination. All of the information generated by the various inputs of the headquarters computer can be stored and associated with a date and time stamp for future reference. In this manner, the headquarters computer provides means for viewing a variety of events in sequence.

An antenna for sensing Internet signal is connected to the mobile box, as is an antenna the GPS antenna. In a preferred embodiment, the antennae are located at the windshield of the vehicle. Other peripherals as necessary are located in the compartment of the vehicle and connected to the box. These peripherals may include a monitor, camera, microphone, or any of the previously mentioned peripherals. Rails are installed at the vehicle frame for anchoring the mobile box if it cannot be connected directly to the vehicle frame. Surge protection means associated with the vehicle's onboard power system provides power to the box.

In one preferred embodiment, the headquarters laptop and other hardware are configured to fit in a stationary box. The stationary box comprises a monitor, in one embodiment not less than 22 inches, a replacement battery designed to provide reliable 12 volt power and recharge capable, a power inverter for converting D/C to A/C, and a camera means. Other hardware peripherals mentioned above may be incorporated into the system and connected to the box.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. An improved method of ensuring secure travel between predetermined points comprising the steps of:
   a. establishing a predetermined route, comprising a transportation route for passengers;
   b. confirming that wireless Internet coverage is available along the route;
   c. providing a first device capable of connecting to the Internet, comprising audiovisual recording and transmitting means, and associated with a moving vehicle; wherein multiple individual subscribers have access to data provided by the first device;

d. providing a unique identifier defined as a means to accurately correlate an identification code associated with the first device and providing a unique passenger identifier, enabling passengers to be identified individually aboard the vehicle;

e. providing location determining means associated with the first device, that identifies the location of the subscriber;

f. providing a second device capable of connecting to the Internet, comprising audiovisual recording and transmitting means, and associated with a second location; wherein location information and audiovisual signals are transmitted to the headquarters, and wherein location information and audiovisual signals regarding individual subscribers can be accessed via the Internet.

2. The method of claim 1, wherein the first device comprises a laptop disposed in a vehicle, further comprising a camera, global positioning system, wireless Internet linking means, continuous power source, and an audiovisual display associated with the laptop.

3. The method of claim 1, wherein the second device comprises a laptop or desktop computer further comprising a camera, global positioning system, wireless Internet linking means, continuous power source, and an audiovisual display associated with the laptop or desktop computer.

4. The method of claim 1, wherein the first and second devices comprise inputs for data relating to any of the inputs chosen from the list of; keypad or keyboard means, destination change instructions, identification tag reading means, magnetic stripe card reading means, destination indicating means, route indicating means, emergency indicating means, burglary detection means, listening device initiation means, smoke detection means, carbon monoxide detection means, compressed natural gas lead sensing means, and medical device input means.

5. The method of claim 1, wherein the transportation route comprises a series of transit destinations, and wherein the location determining means causes data to be transmitted upon arrival of the first device at a transit destination.

6. The method of claim 1, wherein inputs on the first device are associated with devices on the vehicle chosen from the list of: camera, audio input, speaker, microphone, laptop, cash acceptance means, destination indicator, emergency indicator, and display.

7. The method of claim 1, wherein the inputs on the second device are associated with devices at the stationary location chosen from the list of: display panel, power supply, inverter from A/C to D/C, power means including batteries or solar 110V power supply, and peripheral inputs including card reading means, printer, video display, audio, and emergency indicator.

8. The method of claim 1, wherein the system is initiated automatically upon the occurrence of a predetermined condition, or manually.

9. The method of claim 1, wherein a series of GPS coordinates are documented and incorporated into the system as predetermined positions linked to the destination name and physical address of the position.

10. The method of claim 9, wherein the software of the system is updated to contain the GPS coordinates of the predetermined positions for a specific route along which the method will be conducted.

11. The method of claim 10, wherein the updated code is installed on the first device, and wherein a series of first devices are associated with a vehicle.

12. The method of claim 6, wherein the devices are installed in a protective housing.

13. The method of claim 7, wherein the devices are installed in a protective housing.

14. The method of claim 1, wherein signals are transmitted from the first device to the second device, and from the second device to the first device.

15. The method of claim 1, wherein a laptop with wireless capability, telephone or other communications hardware has wireless connectivity to the Internet.

16. The method of claim 2, wherein users of the method associated with the first device have their own identification numbers and email addresses assigned by the controller of the second device.

17. The method of claim 1, wherein the first devices are programmed to automatically configure software for travel between the predetermined positions.

* * * * *